United States Patent
Hesse et al.

(10) Patent No.: US 8,546,721 B2
(45) Date of Patent: Oct. 1, 2013

(54) SEAM POSITION CONTROL FOR LASER PROCESSING

(75) Inventors: Tim Hesse, Ditzingen (DE); Dieter Pfitzner, Weil der Stadt (DE); Winfried Magg, Ditzingen (DE)

(73) Assignee: TRUMPF Werkzeugmaschinen GmbH + Co. KG, Ditzingea (DE)

( * ) Notice: Subject to any disclaimer, the term of this patent is extended or adjusted under 35 U.S.C. 154(b) by 1063 days.

(21) Appl. No.: 12/274,116

(22) Filed: Nov. 19, 2008

(65) Prior Publication Data

US 2009/0139968 A1    Jun. 4, 2009

(51) Int. Cl.
  *B23K 26/00*    (2006.01)
  *B23K 26/24*    (2006.01)
  *G06F 19/00*    (2011.01)

(52) U.S. Cl.
  USPC ............... 219/121.64; 219/121.85; 228/103; 700/166; 702/35

(58) Field of Classification Search
  USPC ............ 219/121.63, 121.64, 121.78, 121.79, 219/121.81, 121.82, 121.83; 700/254, 166; 318/568.13; 382/141; 228/103, 104, 264, 228/57; 73/588; 702/35, 182, 183; 29/701–703, 709–713
  See application file for complete search history.

(56) References Cited

U.S. PATENT DOCUMENTS

| | | | | |
|---|---|---|---|---|
| 3,532,807 A | * | 10/1970 | Wall, Jr. et al. | 348/90 |
| 3,626,145 A | * | 12/1971 | Jackson | 219/123 |
| 4,010,346 A | * | 3/1977 | Cecil et al. | 219/124.34 |
| 4,477,713 A | * | 10/1984 | Cook et al. | 219/124.34 |
| 4,609,806 A | * | 9/1986 | Grabkowski et al. | 219/95 |
| 4,812,614 A | * | 3/1989 | Wang et al. | 219/124.34 |
| 5,511,007 A | * | 4/1996 | Nihei et al. | 702/183 |
| 6,040,550 A | | 3/2000 | Chang | |
| 7,239,736 B2 | * | 7/2007 | Fujita et al. | 382/141 |
| 2002/0088778 A1 | | 7/2002 | Chang | |

FOREIGN PATENT DOCUMENTS

| | | |
|---|---|---|
| DE | 4005314 | 8/1991 |
| EP | 1371433 | 12/2003 |
| JP | 08118022 A * | 5/1996 |
| JP | 09267186 A * | 10/1997 |
| JP | 2007160349 A * | 6/2007 |

* cited by examiner

*Primary Examiner* — Samuel M Heinrich
(74) *Attorney, Agent, or Firm* — Fish & Richardson P.C.

(57) ABSTRACT

A course of a position of a positioning device is determined as a laser beam welds a workpiece at a focus area of the laser beam. The positioning device is configured to position the focus area of a laser beam on a workpiece such that a joint is formed on the workpiece. A course of the joint on the workpiece from the determined course of the position of the positioning device is estimated, and a deviation between the determined course of the position of the positioning device and the estimated course of the joint on the workpiece is calculated. The deviation represents a parameter related to the precision of the seam position control.

21 Claims, 2 Drawing Sheets

SEAM POSITION CONTROL FOR LASER PROCESSING

CROSS-REFERENCE TO RELATED APPLICATIONS

This application claims priority under 35 U.S.C. § 119(a) to European Application No. 07 022 470.4-1262, filed on Nov. 20, 2007, the entire contents of which are hereby incorporated by reference.

TECHNICAL FIELD

This disclosure relates to seam position control of a laser welding process. Seam position control includes determining at least one parameter for the precision of the seam position control of a laser welding process performed on a rotationally symmetrical workpiece.

BACKGROUND

U.S. Pat. No. 6,040,550 discloses techniques for controlled laser welding of a radial seam at a joint between two membranes of a bellows. An optical tracking device tracks the joint site between the two membranes that are arranged next to each other and rotate about a common axis. The laser beam can be steered such that the laser beam impinges on the outer edge of each of the two membranes to edge weld the rotating membranes at the joint site.

German Patent No. DE 4005314A1 describes a method for micro-soldering with a laser and measuring the soldering spot temperature with a pyrometer camera. The temperature is regulated by a regulating circuit. Through analysis of the actual or nominal signal used in the regulation system, conclusions can be drawn about the solder process or solder errors occurring, which can lead to improved process control on soldering. European Patent No. EP 1371443B1 describes techniques for monitoring laser welds and assessing the weld quality. Radiation produced in the welding area and the power of the laser beam are measured using sensors. The signals measured by the sensors are analyzed and characteristics of the signals are extracted and classified to provide an indication of the quality of the laser weld.

SUMMARY

This disclosure relates to techniques for determining at least one parameter for the precision of the seam position control of a laser welding process and to checking and analysis of the quality of the seam position control.

In one general aspect, a method for determining a parameter related to the precision of a seam position control of a laser welding process performed on a workpiece includes determining a course of a position of a positioning device as a laser beam welds a workpiece at a focus area of the laser beam, the positioning device being configured to position the focus area of a laser beam on a workpiece such that a joint is formed on the workpiece, estimating a course of the joint on the workpiece from the determined course of the position of the positioning device, and calculating a deviation between the determined course of the position of the positioning device and the estimated course of the joint on the workpiece. The deviation represents a parameter related to the precision of the seam position control.

Implementations can include one or more of the following features. If the calculated deviation exceeds a threshold value, the workpiece can be marked as unacceptable. Determining the course of a position of the positioning device can include determining the course of a position representative of the positioning device. The position representative of the positioning device can be a position of the focus area of the laser beam. Determining the course of a position of the positioning device can include determining the course of a measured position of the positioning device. Estimating the course of the joint on the workpiece from the determined course of the position of the positioning device can include one or more of interpolating between position values of the positioning device and finding a mean value and an amplitude of the position values. Estimating the course of the joint on the workpiece from the determined course of the position of the positioning device can include specifying a continuous mathematical function. The mathematical function is a periodic function having parameters of amplitude (A) and mean (M) for the course of the joint on the workpiece, the parameters (A, M) being determined from the course of the position of the positioning device. The deviation between the course of the position of the positioning device and the estimated course of the joint can include a sum of the mean error squares.

In some implementations, determining the course of a position of a positioning device can include determining a course of the positioning device in a direction axial to the joint or in a direction aligned with a propagation direction of the laser beam. At least one additional parameter based on the estimated course of the joint can be determined, and a run-out or offset of the workpiece can be calculated based on the at least one additional parameter. The additional parameter can be a mean value of the course of the joint or an amplitude of the estimated course of the joint. At least one additional parameter can be determined from the course of the position of the positioning device, and a hysteresis of the workpiece can be determined based on the at least one additional parameter. At least one additional parameter of the seam position control can be determined, and the additional parameter can include one or more of a number of measurement drop-outs and a position of the focus area on the workpiece.

In some implementations, the deviation can be compared to a threshold value, and, if the deviation exceeds the threshold value, the workpiece can be classified as a workpiece to be tested. If the deviation exceeds the threshold, the workpiece classified as to be tested can be tested by analyzing the joint formed during the laser welding process. The at least one additional parameter can be compared to a threshold value, and, if the at least one additional parameter exceeds the threshold value, the workpiece can be classified as a workpiece to be tested.

The precision of the seam position control can be determined from at least two parameters, and the two parameters can include the determined deviation and one or more of a mean (M) of the determined course of the joint and an amplitude (A) of the determined course of the joint. The workpiece can be a rotationally symmetric workpiece. Calculating the deviation between the determined course of the position of the positioning device and the estimated course of the joint on the workpiece can occur after the joint on the workpiece is formed.

In another general aspect, a laser machining apparatus includes a focusing lens arranged in a laser machining head configured to direct a laser beam to a focus area on a workpiece such that the workpiece is welded at the focus area, first and second lasers that project first and second laser lines onto the workpiece in the vicinity of the focus area, and a sensor configured to sense radiation from the workpiece at the focus area and at the region in the vicinity of the focus area. The apparatus also includes first and second positioning devices configured to position the focus area on the workpiece, a seam position control device configured to determine a position of the positioning devices, and an analysis device configured to estimate a course of the position of the positioning devices to calculate a parameter related to the precision of the seam position control.

Implementations can include one or more of the following features. The sensor can include a complementary meal oxide semiconductor (CMOS) camera. The seam position control device can be configured to determine a position representative of the position of the positioning devices. The seam position control device can be configured to evaluate the sensed radiation and estimate a position of the focus area, and the position representative of the position of the positioning devices can be the estimated position of the focus area. The seam position control device being configured to determine a position of the positioning device can include the seam position control device being configured to access a measured position of the positioning device.

In yet another general aspect, a method for determining a parameter related to the precision of a seam position control of laser welding performed on a workpiece includes computing a course of a position of a positioning device as a laser beam welds a workpiece at a focus area of the laser beam, the positioning device being configured to position the focus area of a laser beam on a workpiece such that a joint is formed on the workpiece, estimating a course of the joint on the workpiece from the computed course of the position of the positioning device, calculating a parameter representing a difference between the computed course of the position of the positioning device and the estimated course of the joint on the workpiece, the difference representing a parameter related to a precision of the seam position control, and generating a measure of acceptability of the joint on the workpiece based on the calculated difference.

In laser welding of gear components (which can be referred to as workpieces), high requirements are imposed on the positioning of the laser beam to the joint gap or joint site and hence the resulting weld seam quality. New weld processes in particular, such as welding of steel with cast steel without additive materials, for metallurgical reasons can require seam positioning in a tolerance range of a few hundreds of a millimeter.

To achieve these accuracy requirements, automatic seam tracking is used. This seam tracking establishes the position of the joint using a projected laser light line (which also can be referred to as a laser light section) that is arranged in front of the welding process and is detected by a camera. Starting from this measurement, the machining laser beam or its focus area is positioned at the correct time, via a positioning device on the laser machining head, correctly to the joint site of the workpiece. However, seam position control involves a number of individual components which can be subject to disruption. Typical examples of such disruptions include local mechanical damage of the joint site, faulty clamping of rotationally symmetrical workpieces, which can lead to a large wobble of the workpiece, thermally induced image distortions of the advancing laser light line caused by the welding process, offset or thermally induced drift movement of the laser beam in the welding optical system, and malfunction of the sensors due to soiling. These disruptions can lead to the actual seam position control running outside the permitted tolerance or not being reliable.

In general, in both cases the workpiece must be extracted from the production chain after completion of the weld seam and sent for manual component inspection or approval.

In one implementation of the inventive method, to assess the precision of the seam position control, a temporal development of a nominal or actual position of a positioning device for positioning of a focus area of a laser beam on a workpiece is determined as the laser beam welds the workpiece, the course of a joint on the workpiece is determined from the course of a nominal position or from the course of an actual position of the positioning device, a deviation between the course of the nominal or actual position of the positioning device and the course of the joint is determined, the deviation being a parameter for assessing the precision of the seam position control.

The nominal position of the positioning device results from the laser light section measurement, and the nominal position serves as a nominal value for movement of the positioning device along a correction axis, or correction axes. The nominal position can be a position that is representative of the position of the positioning device. For example, the nominal position can be a position of the joint site in front of the welding process or the focus area of the laser beam on the workpiece. The correction axis also can be referred to as a positioning axis/axes. Alternatively or additionally, the actual position of the positioning device can also be measured during the laser welding process and stored. The actual position of the positioning device can be measured or pre-programmed into a machine that moves and/or controls the positioning device. The positioning devices can be arranged on a laser machining head and can move the entire laser machining head. Alternatively, the positioning devices can be arranged on one or more optical elements in the path of the laser beam and can cause a movement of the optical element to position the laser beam. For example, displacement and/or tilting of a mirror or a lens or shifting of an optical fiber connection in the laser machining head can position the laser beam.

From the temporal course of the nominal or actual position of the positioning device (e.g., the nominal or actual position of the positioning device over time as the workpeice is rotated and welded), an (ideal) course of the joint can be determined. The ideal course can be described by a continuous mathematical function. The precision of the seam position control is assessed by determination of a deviation of the nominal or actual position signal from the ideal course. The determined deviation gives a measure for the control deviation (e.g., deviation of the position of the laser machining head or focus area from the position of the joint). The control deviation cannot generally be obtained directly because the joint site is concealed by the weld process in the vicinity of the focus area, and, therefore, the position of the joint site is not easily measured during welding.

The described techniques can be carried out after the laser welding process or by interpolation during the laser welding process. Additionally, the actual movement of the positioning device allows checking and evaluation of the quality of the seam position control.

In one implementation, a continuous, typically periodic mathematical function is given for the course of the weld joint, and the parameters of the function are adapted to the course of the nominal or actual position of the positioning device. This implementation can be used, for example, when welding workpieces in which the course of the joint can be described with adequate accuracy by a continuous mathematical function, such as, for example, when welding straight linear seams on profiles or when welding rotationally symmetrical workpieces in which the weld joint can have a course described by a mathematical function, such as a sine-wave course.

In one implementation, the deviation between the course of the nominal or actual position of the positioning device and the course of the joint site is determined as the sum of the mean error squares (chi square error). The sum of the mean error squares constitutes a suitable measure for the quality of adaptation of the course of the positioning device's nominal or actual position to the course of the joint, and the deviation or difference can be determined locally and/or over a section of a course.

The course of the nominal or actual position of the positioning device position is usually measured during a full revolution of a rotational movement of the workpiece. The workpiece is typically rotationally symmetrical. In this case, the rotationally symmetrical workpiece is rotated about a rotation axis during the laser welding process. The parameter is then determined only after the end of the laser welding process. Alternatively, the position values of the positioning device can be measured over a small angular range (e.g. 20°), and the parameter can also be determined during the welding process such that where applicable intervention can be made in the welding process or seam position control to improve the quality of the weld.

The course of the nominal or actual position of the positioning device can be determined axially to the joint site and/or in the propagation direction of the laser beam. Deviations from the ideal position of the laser beam relative to the joint site are compensated, during the rotational movement of the workpiece, by movements of the positioning devices on the basis of nominal values of the seam position control. The correction movement can be axial to the joint site in order to, for example, compensate for a constant lateral offset of the workpiece and the workpiece run-out, and radial to the joint site in order to, for example, correct the concentricity by adjusting the working distance of the welding optical system/machining head to the workpiece.

In one implementation, at least one further parameter is determined from the course of the joint, in particular to assess the run-out of a rotationally symmetrical workpiece or the workpiece offset. Rotationally symmetrical workpieces that have an axis of symmetry are, on welding, frequently turned about a rotation axis aligned perpendicular to the beam direction of the laser machining head. The alignment of the rotation axis can, however, deviate from the alignment of the workpiece axis of symmetry, so that the workpiece performs a tumble movement. The tumble movement leads to a so-called run-out in the axial direction and to a concentricity defect in the radial direction, which can be described by a sine-wave path with period count 1, or at constant speed of rotational movement by an angular speed $\omega = 1/(2\pi)$ radians per second (rad/s). Furthermore, a (constant) axial offset can occur between the workpiece position and the zero position of the laser machining head in the axial direction, which can also result from an incorrect clamping of the workpiece. The defects listed above can, without seam position control, lead to a defective seam position.

At least one additional parameter from the course of the actual position of the positioning device can be determined. For example, an additional parameter can be used to assess a hysteresis of the workpiece. The hysteresis of the workpiece is the difference between the position of the axial positioning device at the start and at the end of a complete revolution of radial welding. The hysteresis is provoked by the shift of the workpiece during the welding process. The shift can be caused by, for example, heating of clamping elements used to hold the workpiece in place as the workpiece is welded.

In some implementations, at least one additional parameter is determined for the precision of the seam position control.

The additional parameter can include one or more of the following parameters: a number of measurement drop-outs and the position of the focus area on the workpiece. The number of drop-outs in measurement indicates a measure of reliability of the control system. Drop-outs in measurement can occur due to thermally induced image interference on laser welding. Analysis of the position of the focus area in the lateral direction can indicate shift or drift movement of the laser beam in the optical system.

The parameters can be compared with an associated threshold value, and, if the parameters meet or exceed the threshold value, the workpiece can be classified as a workpiece that should undergo further testing. Assessment of the parameters can occur after the welding process, and exceeding or meeting the threshold value of any individual parameter can lead to classification of the workpiece as a workpiece to be tested.

In some implementations, the result of classification of the workpiece can be indicated by an output of a visual or acoustic signal to an operator, where depending on the parameter that had a value meeting or exceeding the threshold, conclusions can be drawn on the nature of the welding fault. For a the workpiece classified as to be tested, a weld seam formed in the laser welding process is checked automatically and/or manually. For manual checking, the workpiece is extracted from the production chain. For automatic checking of the weld seam, the workpiece can be moved to a specified control station in the production chain.

In some implementations, the accuracy of the seam position control is classified as adequate or inadequate on the basis of at least two parameters. The individual checks of parameters can be used for an overall assessment of seam position control, where from the overall result a conclusion can be drawn on the quality of the weld seam, and an extensive diagnosis of the sensor or actor system and the welding optical system is possible. The results of the accuracy check can also be stored.

Further features and advantages of the techniques discussed above ensue from the following description of examples, from the figures, and from the claims. The techniques can be implemented as a method, process, device, apparatus, or computer software that includes instructions stored on a computer-readable medium. The individual features can be put into effect in a variant of the techniques discussed either individually, or in a plurality of any kind of combination.

DETAILED DESCRIPTION

Figure 1:
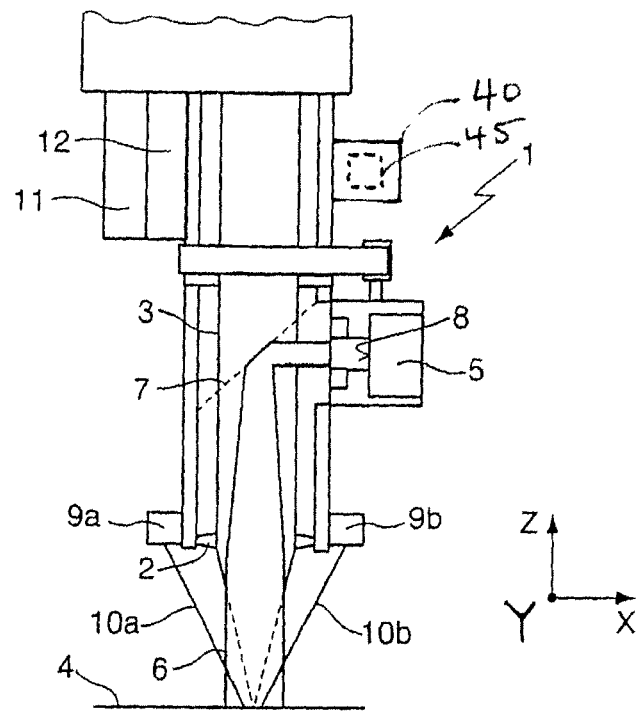
FIG. 1 shows a laser machining head and a sensor.

Referring to FIG. 1, a laser machining head 1 with a focusing lens 2 that focuses a laser beam 3 onto a workpiece 4 to perform laser welding is shown. The laser beam 3 is guided by the laser machining head 1 to a focus area (not shown) on the workpiece 4 to perform laser welding on the workpiece 4. To monitor a welding area 30 on the workpiece 4, a camera 5 (which can be a complementary metal oxide semiconductor (CMOS) camera) is fitted to the laser machining head 1. A beam path 6 of the CMOS camera 5 is bent at a partly transmissive deflection mirror 7 and directed onto a sensor surface 8 of the CMOS camera 5. The sensor surface 8 of the CMOS camera 5 images the workpiece 4 at the focus area of the laser beam 3 and at a section of the workpiece 4 in the vicinity of the laser beam 3. Two line projectors 9a, 9b are provided on the laser machining head 1, and the line projectors 9a, 9b project two laser light lines 10a, 10b into the welding area 30 that is monitored by the CMOS camera 5. The two laser light lines 10a and 10b are incident on a section of the workpiece 4 that is in the vicinity of the laser beam 3. As discussed in more detail below, the laser machining head 1 can be shifted along two positioning axes, which can be linear axes (Z, Y), by positioning devices 11, 12 to move the laser beam 3 to an optimum weld position.

The movement of the positioning devices is controlled by a seam position control device 40. The seam position control device 40 is configured to evaluate radiation sensed by the camera 5 and to determine a nominal position and/or an actual position of the positioning devices 11, 12. The nominal position of the positioning devices 11,12 can be a position that is representative of the position of the positioning devices 11,12. For example, the nominal position can be a position or location of the focus area of the laser beam 3. Because the positioning devices 11,12 position the laser machining head 1, which produces the laser beam 3, the position of the focus area of the laser beam 3 provides an estimate of the position of the positioning devices 11,12. Alternatively or additionally, the seam position control device 40 can be configured to determine an actual position of the positioning devices 11,12. The actual position of the positioning devices 11,12 can be a position of the positioning devices 11,12 that is measured directly by the seam position control device 40 or received from the positioning devices 11,12 by the seam position control device 40.

An analysis device 45 is configured to evaluate the nominal or actual position of the positioning devices 11, 12 to determine a parameter related to the precision of the seam position control. The analysis device 45 can be part of the seam position control device 40. The seam position control device 40 can be implemented as a computer that includes a processor and memory, and the analysis device 45 can be implemented as a software or hardware component of the seam position control device 40. The seam position control device 40 is in communication with the laser machine head 1. Although in the example shown in FIG. 1, the seam position control device 40 is part of the laser machining head 1, in other examples the seam position control device 40 can be arranged at a location remote from the laser machining head 1. For example, the seam position control device 40 can be in a control computer (not shown) for controlling the laser machining apparatus.

Figure 2:
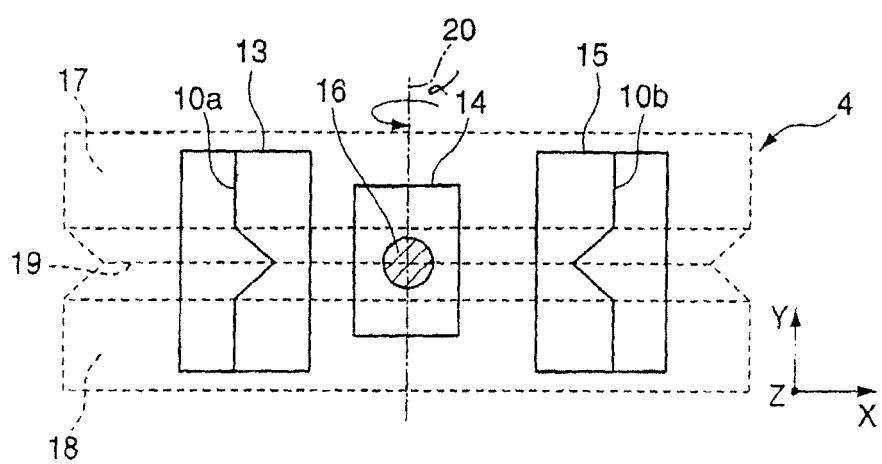
FIG. 2 shows three measurement zones along a joint of a workpiece welded with the laser machining head.

Referring to FIG. 2, three measurement zones 13 to 15 at the sensor surface 8 of the CMOS camera 5 are shown along with a representation of the workpiece 4. The three measurement zones 13 to 15 correspond to the areas in which the intensity of the light irradiated onto the sensor surface 8 is evaluated by an analysis device implemented in a seam position control device (not shown). The seam position control device can be similar to the seam position control device 40 discussed above with respect to FIG. 1. The three measurement zones 13 to 15 are arranged in succession in a line along a first direction (X-direction). The first measurement zone 13 (which can be referred to as a pre-measurement window) detects a section of the workpiece 4 ahead of the laser beam 3 (e.g., before the section of the workpiece 4 is welded by the laser beam 3). The first laser light line 10a is projected onto the first measurement zone 13. The second measurement zone 14 (which can be referred to as the in-measurement window) detects the immediate weld region with a focus area 16 of the laser beam. The third measurement zone 15 (which can be referred to as the post-measurement window) detects a section of the workpiece 4 following the welding of the section by the laser beam 3. The second laser light line 10b is projected onto the third measurement zone 15. Although in the example of FIG. 2, the square form of the measurement zones 13 to 15 is shown, forms of other shapes (such as rectangles) can be selected. The three measurement zones 13 to 15 can have the same form and dimensions. The first measurement zone 13 and the third measurement zone 15 are in the vicinity of the measurement zone 14. The first measurement zone 13 and the third measurement zone 15 can be adjacent to the measurement zone 14.

FIG. 2 also shows the rotationally symmetrical workpiece 4, which includes two workpiece parts 17, 18 lying against each other along a joint 19. In the example shown in FIG. 2, the workpiece 4 is rotationally symmetrical about the rotational axis 20. To perform the laser welding, the workpiece 4 is rotated about a rotational axis 20 that runs in a first, axial direction (Y-direction). Perpendicular to the axial Y-direction and perpendicular to the image plane of the camera 5 runs a second, radial direction (Z-direction) that corresponds to the propagation direction of the laser beam 3. The focus area 16 of the laser beam 3 forms a weld point on the workpiece 4.

FIG. 2 shows the start of the laser welding, in which the first and third measurement zones 13, 15 serve to detect the position of the joint 19 in the Y-direction and the Z-direction by detecting the laser light lines 10a, 10b that respectively illuminate the first and third measurement zones 13, 15 and are detected by the CMOS camera 5. The second measurement zone 14 is used to detect the position of the focus area 16 of the laser beam 3. During the welding process, the workpiece 4 rotates about the rotational axis 20 through a rotation angle α. A weld seam (not shown) is formed behind the focus area 16, and the weld seam is monitored in the third measurement zone 15. The first measurement zone 13 also serves to detect the position of the joint 19 during the welding process. From the measured position of the joint 19 in the Y-direction and the Z-direction, nominal values are calculated for the position of the focus area 16. The nominal values can be calculated in a track planning unit of the seam position control device.

Figure 3:
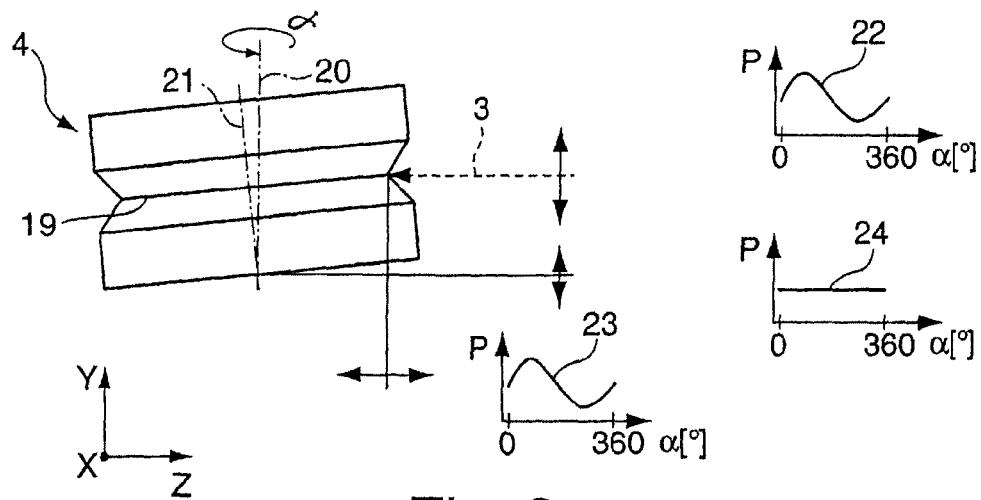
FIG. 3 shows a rotationally symmetrical workpiece in a laser welding process.

Referring to FIG. 3, the workpiece 4 is shown rotated through 90° in the X-Z plane in comparison with FIG. 2, so that the laser beam 3 (indicated by the dashed arrow) is visible. In practice, the joint 19 is often not aligned precisely perpendicular to the rotation axis 20 as shown in FIG. 2. Rather, as shown in FIG. 3, the joint 19 deviates from this perpendicular alignment because the rotation axis 20 and a symmetry axis 21 of the rotationally symmetrical workpiece 4 do not coincide. The deviation in alignment of the rotation axis 20 and the symmetry axis 21 can be caused by, for example, incorrect positioning in clamping the workpiece 4.

On rotation about the rotation axis 20, the workpiece 4 executes a tumble movement so that the position of the joint 19 changes in both the Y-direction and the Z-direction. The resulting positioning error is described by three error types: (1) run-out, (2) constant axial offset, and (3) concentricity error. The run-out is in the Y-direction, and the concentricity error is in the Z-direction. The run-out and the concentricity error, on a complete revolution of the workpiece 4 about rotation axis 20, show a sine-wave course 22, 23 of position (P) as a function of the rotational angle α. The period length of the sine-wave course 22, 23 corresponds to one revolution of the workpiece 4 about the rotation axis 20. The concentricity error during a full rotation of the workpiece 4 can be described by a sine-wave path with period count 1, or at constant speed of rotational movement by an angular speed $\omega=1/(2\pi)$ radians per second (rad/s). The constant axial offset, which depends on the deviation of position of the workpiece 4 in the Y-direction from the desired zero position, has a constant course 24 as a function of the rotation angle $\alpha$. The constant axial offset can occur between the position of the workpiece 4 and the zero position of the laser machining head 1 in the axial direction. The constant axial offset can result from an incorrect clamping of the workpiece 4. The defects listed above can, without seam position control, lead to a defective seam position.

As discussed above, during the rotational movement of the workpiece 4 about the Y-direction, the position of the joint 19 ahead of the weld is measured in both the Y-direction and the Z-direction and a nominal value for the position of the focus area 16 is calculated. Additionally, the position of the joint 19 in the Z-direction can be measured by, for example, analysis of position of the light sections 10a, 10b, which are, respectively, before and after the weld.

Figure 4:
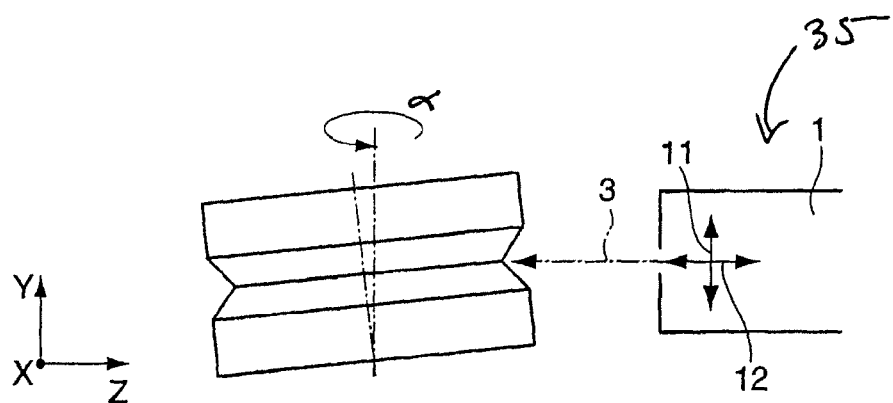
FIG. 4 shows a seam position control that controls positioning devices of the laser machining head.

Referring to FIG. 4, a seam position control 35 that controls the positioning devices 11, 12 to control the linear movement of the laser machining head 1 in the Y-direction and the Z-direction is shown. The constant axial offset of the workpiece 4 and its run-out are compensated by the positioning device 11, which moves in the Y-direction. The concentricity error of the workpiece 4 is compensated by the positioning device 12, which runs in the Z-direction (the direction of propagation of the laser beam 3). The compensation does not necessarily occur through movement of the laser machining head 1. For example, in addition to or instead of moving the laser machining head 1, the focusing lens 2 in the laser machining head 1 can be shifted, the form of a deflection mirror arranged in the laser machining head 1 can be changed, a mirror provided in the beam guide can be tilted, or a connection of an optical fiber to guide the laser beam 3 in the laser machining head 1 can be shifted to move the laser beam 3. Thus, all or any of these elements can serve as positioning devices, for positioning the focus area 16 on the workpiece 4.

Figure 5:
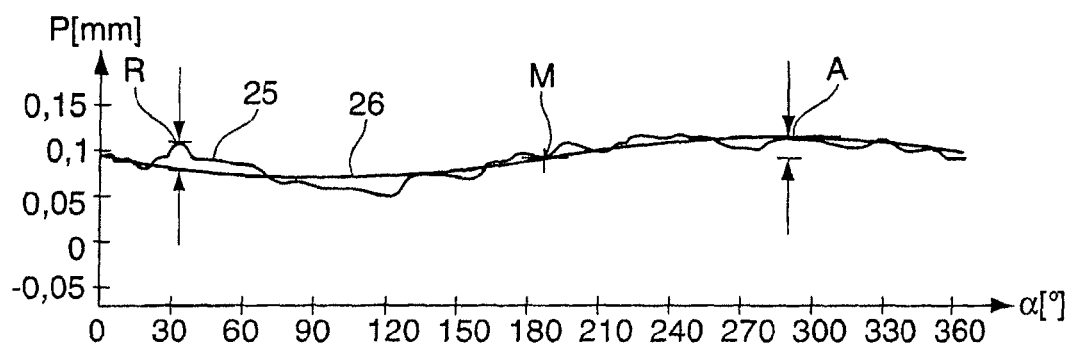
FIG. 5 shows a course of a position of the positioning device and an ideal course for a joint of a workpiece as the workpeice is rotated about a rotation angle.

Referring to FIG. 5, a course 25 of the actual position or the nominal position of the positioning device 11 over the entire rotation angle range is shown. In addition to the measurement data of the seam position control, the resulting nominal position data or the actual process movements performed (e.g., the actual positions P of the positioning devices 11, 12 during the welding process) are detected with a high sampling rate and stored for the course 25 of the nominal or actual position (P) of the positioning device 11 aligned in the Y direction over the entire rotational angle range of 360° used in welding. As discussed above with respect to FIG. 3, the theoretical course 26 of the joint 19 in the Y direction corresponds to a sine-wave function with a period length of one complete revolution of the workpiece 4. Thus, only the phase (not shown), the mean value (M), and the amplitude (A) (distance between mean and maximum) of the sine function need be determined. The phase and the amplitude can be determined by fitting the measured data to a sine function (e.g., by determining the smallest error square or by another suitable method). The difference in actual movement of the positioning device 11 from the theoretical sine-wave course 26 of the joint 19 as a function of the rotational angle $\alpha$ is evaluated as a measure of the control deviation (R) and can serve as a parameter for evaluating the precision of the seam position control. A similar technique can be carried out on the positioning device 12 aligned in the propagation direction "Z" of the laser beam 3.

In one implementation, the deviation between the course of the actual position 25 of the positioning device 11 and the theoretical course 26 of the joint 19 is determined as the sum of the mean error square between each point on the actual position 25 and the theoretical course 26. This error is the chi square error. The chi square error can be used as a measure for the quality of adaptation of the course of the actual position 25 to the theoretical course 26 of the joint 19. The deviation or difference between the course of the actual position 25 and the theoretical course 26 can be determined locally and/or over a section of a course.

The control deviation (R), and, hence, the accuracy of the seam position control over the entire rotational angle range of 360° can for example be characterized as a parameter by the size of the chi square error, which was already minimized in adaptation of the course 26 of the joint 19 to the course 25 of the position of the positioning device 11. If the chi square error exceeds a specified threshold value, the control movement does not follow a plausible course of the joint 19 and the workpiece 4 can be classified as to be checked. As discussed above, classifying the workpiece 4 as a workpiece to be checked results in the weld seam on the workpiece 4 being checked automatically or manually, where in the latter case the workpiece 4 to be tested is extracted from the production process. When noticing excessive deviations, the checking of the weld seam can be omitted and the workpiece rejected directly.

In addition to the deviation between the course 25 of the positioning device actual position (P) and the (theoretical) course of the joint 26, other parameters of the weld process can be determined and compared with associated threshold values. Exceeding or meeting the threshold value of any individual parameter can lead to exclusion of the workpiece 4 or checking of the weld seam on the workpiece 4. Additionally, depending on the nature of the threshold value exceeded, a conclusion can be drawn on the type or source of the fault.

Additional parameters can be, for example, the size of the run-out, which corresponds to the amplitude (A) of the course 26 of the joint 19. The amplitude (A) of the course 26 is a measure of the wobble of the workpiece 4. Also, the size of the axial workpiece offset, corresponding to mean value (M) of the sine-wave course 26, can be used as a parameter. Both parameters A and M can indicate a soiling of the clamping device or a dimensional deviation of the workpiece 4.

Additional measurement values of the course 25 of the actual position P of positioning devices 11, 12 can serve as parameters. For example, the hysteresis, which is the difference between the position of positioning devices 11, 12 at the start of the welding process and the end of the welding process, can be determined. From the hysteresis, a conclusion can be drawn regarding the shift of workpiece 4 due to heating of clamping elements during the welding process.

Additional parameters can be determined in the three measurement zones 13 to 15 shown in FIG. 2. For example, the number of measurement drop-outs can be determined, and the number of drop-outs can constitute a measure of the reliability of the control system. Measurement drop-outs can occur due to thermally induced image interference on laser welding. Analysis of the position of the focus area 16 in the lateral direction can indicate shift or drift movement of the laser beam in the optical system.

Furthermore, by determining the position of the light section 10a in a first measurement zone 13 and/or the position of the light section 10b in the third measurement zone 15 during the welding process, the distance of the optical system of the laser machining head 1 to the surface of the workpiece 4 can be determined and the change in the distance used as a parameter.

Also, from knowledge of the lateral position of the focus area 16 on the workpiece 4 within the second measurement range 14, a parameter can be determined that is characteristic of an (unacceptable) shift or drift of the laser beam 3 in the optical system of the laser machining head 1.

As well as the parameters listed above, further parameters not listed in detail for the accuracy of seam position control can be determined. Also, in the method described above a record and analysis of measurement data during the welding process can be undertaken over the complete welding revolution angle of 360°. The data collected by the CMOS camera 5 can be analyzed not just directly after the welding process but also by extrapolation during the welding process by, for example, using a small rotation angle range such as 15° for analysis. If in this case a passing of the threshold value is detected, applicable intervention can be made in the welding process to improve the accuracy of the seam position control.

From the parameters listed above and where applicable further parameters, through a heuristic method an overall assessment of seam position control can take place so that a weld seam on a workpiece can be classified as, for example, acceptable ("OK") or unacceptable ("NOT OK"). As a result, the accuracy of seam position control can be checked and hence the quality of the weld seam formed in the laser welding process on the workpiece 4 can be ensured. Furthermore the method allows comprehensive diagnosis of the sensor and actor system and the welding optical system.

In some implementations, the result of classification of the workpiece 4 is indicated by an output of a visual or acoustic signal. Depending on the parameter that had a value meeting or exceeding the threshold, conclusions can be drawn on the nature of the welding fault. For a workpiece that is classified as a workpiece to be tested, a weld seam formed in the laser welding process can be checked automatically and/or manually. For manual checking, the workpiece is extracted from the production chain. For automatic checking of the weld seam, the workpiece can be moved to a specified control station in the production chain.

The techniques described above are not restricted to welding of radial seams but can be used wherever the (theoretical) course of the joint can be described with adequate precision by a continuous mathematical function, where a mathematical function in the sense of this application also includes interpolation functions such as, for example, splines. In particular, the techniques described above can be used when welding linear seams on profiles.

The foregoing description is intended to illustrate and not limit the scope of the techniques discussed above. Other aspects, advantages, and modifications are within the scope of the following claims.

What is claimed is:

1. A method for determining precision of a seam position control of a laser welding process that has been performed on a workpiece to assess weld joint quality, the method comprising:
    using a laser beam to weld a workpiece to form a joint on a workpiece;
    determining a course of a position of a positioning device as the laser beam welds the workpiece at a focus area of the laser beam, wherein the positioning device is configured to position the focus area of the laser beam on the workpiece such that the joint is formed on the workpiece;
    estimating a course of the joint on the workpiece from the determined course of the position of the positioning device;
    calculating a deviation between the determined course of the position of the positioning device and the estimated course of the joint on the workpiece, wherein the deviation represents a parameter related to the precision of the seam position control; and
    classifying the weld joint as acceptable or to be tested based on the calculated deviation.

2. The method of claim 1, further comprising if the calculated deviation exceeds a threshold value, marking the workpiece as unacceptable.

3. The method of claim 1, wherein determining the course of a position of the positioning device comprises determining the course of a position representative of the positioning device.

4. The method of claim 3, wherein the position representative of the positioning device is a position of the focus area of the laser beam.

5. The method of claim 1, wherein determining the course of a position of the positioning device comprises determining the course of a measured position of the positioning device.

6. The method of claim 1, wherein estimating the course of the joint on the workpiece from the determined course of the position of the positioning device includes one or more of interpolating between position values of the positioning device and finding a mean value and an amplitude of the position values.

7. The method of claim 1, wherein estimating the course of the joint on the workpiece from the determined course of the position of the positioning device comprises specifying a continuous mathematical function.

8. The method of claim 7, wherein the mathematical function is a periodic function having parameters of amplitude (A) and mean (M) for the course of the joint on the workpiece, the parameters (A, M) being determined from the course of the position of the positioning device.

9. The method of claim 7, wherein the deviation between the course of the position of the positioning device and the estimated course of the joint comprises a sum of the mean error squares.

10. The method of claim 8, wherein the deviation between the course of the position of the positioning device and the estimated course of the joint comprises a sum of the mean error squares.

11. The method of claim 1, wherein determining the course of a position of a positioning device comprises determining a course of the positioning device in a direction axial to the joint or in a direction aligned with a propagation direction of the laser beam.

12. The method of claim 1, further comprising:
    determining at least one additional parameter based on the estimated course of the joint; and
    calculating a run-out or offset of the workpiece based on the at least one additional parameter.

13. The method of claim 12, wherein the additional parameter is a mean value of the course of the joint or an amplitude of the estimated course of the joint.

14. The method according to claim 1, further comprising:
    determining at least one additional parameter from the course of the position of the positioning device; and
    calculating a hysteresis of the workpiece based on the determined at least one additional parameter.

15. The method of claim 1, further comprising determining at least one additional parameter of the seam position control, the additional parameter including one or more of a number of measurement drop-outs and a position of the focus area on the workpiece.

16. The method of claim 1, further comprising:
comparing the deviation to a threshold value; and
if the deviation exceeds the threshold value, classifying the workpiece as a workpiece to be tested.

17. The method of claim 16 further comprising, if the deviation exceeds the threshold, testing the workpiece classified as to be tested by analyzing the joint formed during the laser welding process.

18. The method of claim 12, further comprising:
comparing the at least one additional parameter to a threshold value; and
if the at least one additional parameter exceeds the threshold value, classifying the workpiece as a workpiece to be tested.

19. The method of claim 1, wherein the precision of the seam position control is determined from at least two parameters, the two parameters including the determined deviation and one or more of a mean (M) of the determined course of the joint and an amplitude (A) of the determined course of the joint.

20. The method of claim 1, wherein the workpiece is a rotationally symmetric workpiece.

21. The method of claim 1, wherein calculating the deviation between the determined course of the position of the positioning device and the estimated course of the joint on the workpiece occurs after the joint on the workpiece is formed.

* * * * *

UNITED STATES PATENT AND TRADEMARK OFFICE
CERTIFICATE OF CORRECTION

Page 1 of 1

PATENT NO. : 8,546,721 B2
APPLICATION NO. : 12/274116
DATED : October 1, 2013
INVENTOR(S) : Tim Hesse, Dieter Pfitzner and Winfried Magg It is certified that error appears in the above-identified patent and that said Letters Patent is hereby corrected as shown below:

On the title page, Item (73), under Assignee, please delete "Ditzingea" and insert --Ditzingen--.

On the title page, Item (30), please list the following priority information:

--European Patent Application No. 07022470.4-1262, filed November 20, 2007--.

Signed and Sealed this
Third Day of June, 2014

Michelle K. Lee
*Deputy Director of the United States Patent and Trademark Office*